(No Model.)
W. F. GARDNER.
METHOD OF AND APPARATUS FOR TESTING CIRCUITS FOR ELECTRIC TIME SYSTEMS.
No. 480,576. Patented Aug. 9, 1892.
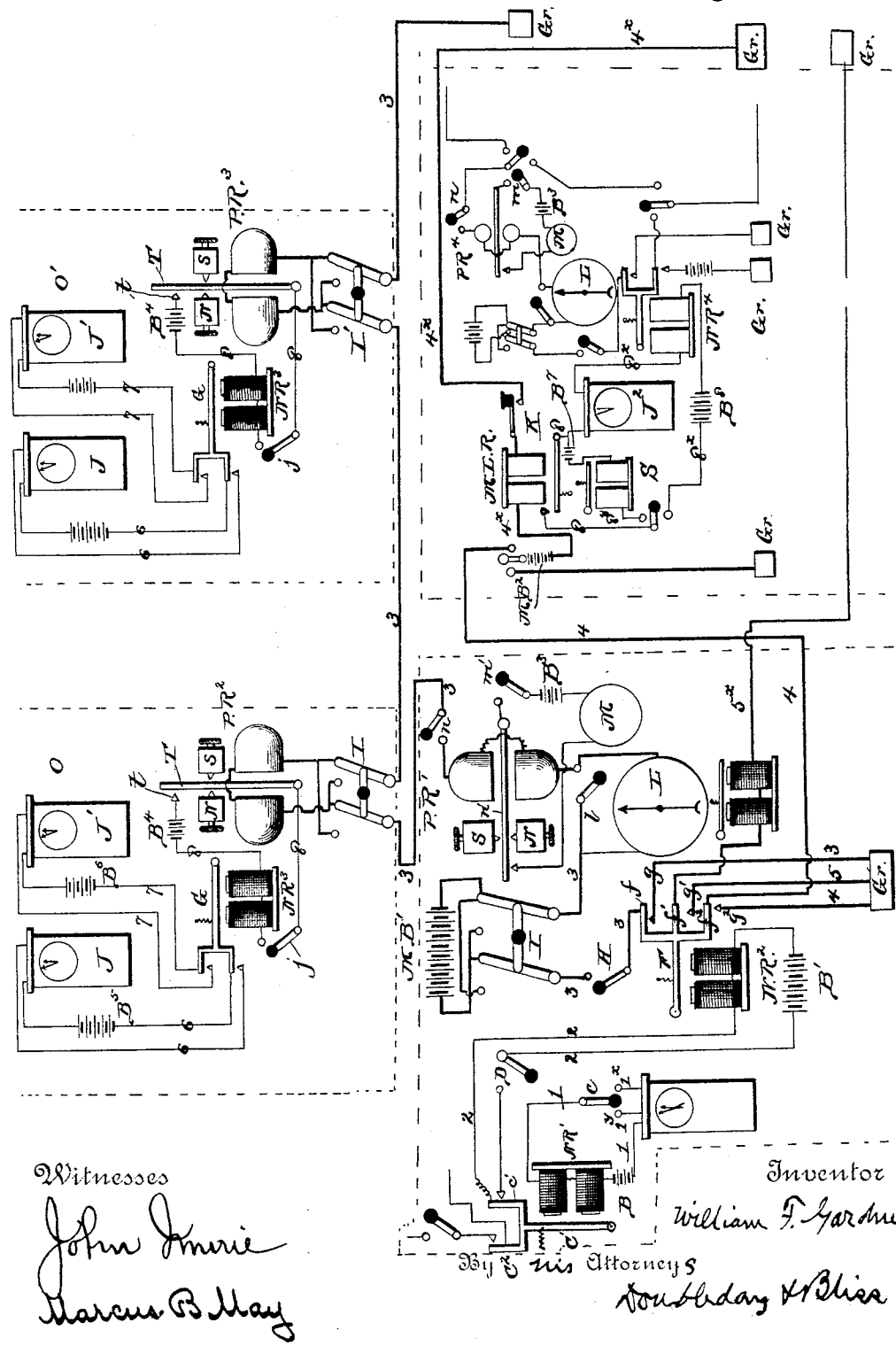

United States Patent Office.

WILLIAM F. GARDNER, OF WASHINGTON, DISTRICT OF COLUMBIA.

METHOD OF AND APPARATUS FOR TESTING CIRCUITS FOR ELECTRIC TIME SYSTEMS.

SPECIFICATION forming part of Letters Patent No. 480,576, dated August 9, 1892.

Application filed January 7, 1891. Renewed July 8, 1892. Serial No. 439,416. (No model.) Patented in France December 10, 1889, No. 201,080.

*To all whom it may concern:*

Be it known that I, WILLIAM F. GARDNER, a citizen of the United States, residing at Washington, in the District of Columbia, have invented certain new and useful Improvements in Time Systems, (patented to me in France December 10, 1889, No. 201,080,) of which the following is a specification, reference being had therein to the accompanying drawing.

This invention relates to an improved method for testing the electric circuits which are used in transmitting time-signals from one point to another or others, and more particularly those circuits which are used in connection with clocks adapted to be actuated, controlled, or synchronized by means of electric impulses transmitted at predetermined times. It also relates to improvements in devices and the arrangement thereof for attaining the purposes above referred to. Experience shows that it is frequently necessary to test a circuit or circuits such as referred to for the purpose of ascertaining whether there is any undue leakage or any complete break, and also to locate the place of leakage or break if one is found to exist.

I prefer to locate the principal portion of the essential parts of the testing apparatus in the observatory or central transmitting-station; but that is not necessary, as they can be located at some other point convenient for the purpose.

The figure on the accompanying drawing is a conventional diagrammatic view of a series of circuits adapted to actuate, control, or synchronize a number of clocks or other time recording or signaling devices. I have selected for illustration that system and arrangement of clocks and electrical mechanisms which I have heretofore used for time-signaling, &c.; but do not intend to limit myself to the details thus shown and to be below described.

At C a clock is indicated such as is used for automatically transmitting electric impulses of one sort or another in time-signaling. For present purposes I will assume that it is a clock adapted to transmit at the termination of one or more hours in a day an impulse indicating exactly the commencement of an hour. The details thereof may be such as are shown and described in my earlier patent, No. 287,015, of October 23, 1883—that is to say, it is adapted to close an electric circuit through 1 1 $1^y$—as, for instance, when sending a program of preliminary signals—and to close it through 1 1 $1^x$, as when sending an hour-signal. There is a battery at B, and a relay, preferably a neutral relay, at NR', both in the aforesaid circuit.

C' is the armature of the relay, it being adapted to close a circuit 2 2 through a battery B' and a second relay $NR^2$. The armature F of the latter may have a single contact or multiple contacts, so that it may close any desired number of electric circuits. In the drawing three such circuits (outgoing) are shown, one being indicated by 3 3, another by 4 4 $4^x$, and a third by 5 $5^x$. That at 4 4 $4^x$ may be one adapted to be used for ordinary commercial telegraphing or telephoning. That at 5 $5^x$ may be similarly used, and it is possible to utilize either or both of these for transmitting time-signals to one or more distant central stations, as will be described, and from which latter the signals can be distributed as from the primary central station.

The circuit 3 3 3 (illustrated in the drawings) is shown as being connected with and used exclusively for operating clocks or other time-signal receiving devices at each of a series of stations, as O O'. The armature F of relay $NR^2$ simultaneously closes all of these outgoing circuits, it having contacts $f f' f^2$, and said circuits having, respectively, corresponding contacts $g g' g^2$. The circuit 3 3 is provided with a switch, at H, a main battery MB', a pole-changer I, a polarized relay PR', and a switch $n$, all preferably in the transmitting-station, which contains the clock C; and in each of a series of distant stations it contains a polarized relay, as at $PR^2$, $PR^3$, and preferably, though not necessarily, in conjunction with each a pole-changer, as at I'.

At the transmitting-station, or at the station from which the testing is to be effected, there is a galvanometer L or equivalent, which can be thrown out or into circuit 3 3 by a switch $l$; and the armature of the polarized relay PR' is adapted to close a local circuit through a bell or indicator at N, having a battery, as at $B^3$.

For the sake of illustration each of the signal-receiving stations O O' is shown as being provided with a number of clocks J J', each having some of its mechanism in a local circuit, as at 6 6 7 7, containing batteries $B^5$ $B^6$. These circuits are closed by one or more relays, as at $NR^3$, the armature G of which can be multiple-armed, so as to actuate a number of local circuits. The relay $NR^3$ is in a circuit 8 8, having a battery $B^4$ and switch $j$, this circuit being closed by the armature T of the polar relay $PR^2$ when current of proper polarity is on main line 3.

I will assume that a current of a positive polarity is used when the ordinary time-signals are being transmitted and that at such time the pole-changers I I' are turned to the right, and that the armatures of the polar relays are moved toward the north poles, (marked N N, respectively.) If the clock C at such time closes circuit 1 1 $1^x$, relay NR' will close circuit 2 2 and $NR^2$ will close circuit 3 3, whereupon (switches H, $n$, and $j$ being closed) an impulse will be experienced in the circuits 6 6 and 7 7, inasmuch as the armatures T of the polar relays $PR^2$, &c., move toward the poles N and the contacts $t$.

At some time when the line 3 3 is idle the test is accomplished as follows: First, the pole-changing switch I is shifted, throwing a negative current to line. This instantly throws the armature-levers T at the distant points toward the south poles S of the relays and holds them away from the contacts that close the clock-circuits. Then the switch $l$ is open, which throws the galvanometer L into the circuit. If the latter indicates the normal amounts of resistance, it may ordinarily be presumed that the circuit is in proper working order; but if from these indications or from any other source of knowledge a leakage or a break should be found to exist the place thereof can be ascertained as follows: At one of the series of distant stations O O', &c., the switch $j$ is opened to prevent any possibility of the magnet at $NR^3$ closing the local circuits 6 6 7 7. Then at that station the terminals of the polarized relay-magnet are reversed either by changing the wires in the binding-posts or by shifting a pole-changer, as at I'. The result of this is to draw armature T (at that station only) again toward the north pole N—that is, draw it in the same direction that it is drawn when the clocks are to be normally affected—because, although a negative current is to line, it is now traversing the coils at this particular station in a direction opposite to that in which it is traversing those of the other stations of the series. The armatures of all the other relays will still lie toward their south poles, away from their local-circuit contacts, and their clocks are safe. The clocks actuated from the station which is being tested are safe by reason of the preliminary opening of the switch $j$, as above mentioned. Now suppose that the first station tested is the middle one of the series. If after the above acts have been performed it is seen that the armature T at that station moves toward its contact, it is proven that there is no break in the line between that station and the battery. Thereupon the wire terminals are replaced (or pole-changer I' is put in normal position) and the armature T instantly leaves its contact $t$ and is again held toward its south pole, whereupon switch $j$ can be again closed with safety. Then the one testing the line goes to the next or to some other station more remote from the battery and repeats this series of steps. The tests are continued until the faulty point is discovered. In the meantime each and all the clocks have been continuing in their normal movement without any interference from the current sent over the main line 3 3, it being negative. By means of the bell or indicator at M, which is in the armature-circuit of the polar relay at the transmitting-station, the attendant there can be informed as to when the circuit is being opened and closed to the negative current. It will be seen that the relays at $NR^3$ are of the nature of "main-line" relays—that is to say, are adapted to open and close succeeding circuits, although not arranged directly in the main line 3 3—and, further, that they are operated by the polarized or other relay which is in the main line. Some of the ends which I attain can be reached if relays or repeaters differing from those at $PR^2$ and $NR^3$ be used, although I prefer the devices shown.

Of course it will be seen that a circuit such as that at 5 5 can when not being used to affect time-signal-receiving instruments be utilized for other purposes than testing if a current of one polarity be used for the other operations.

Another advantage incident to the use of a current-changing switch, as at I, in connection with polarized relays at the receiving-stations lies in the fact that after the circuit has been used for the desired purpose the battery can be so connected to the line that, if from accident or inadvertence the switch $k$ $n$ should be closed a current sent to line would not influence the clocks or receiving-instruments, as it would throw the armature $n^4$ away from their local contacts.

I have shown the line 4 4 $4^x$ as extending out from the primary transmitting-station to a secondary station, from which the signals can be redistributed. The main line proper 4 4 has the battery at $MB^2$, and this can be connected with the loop $4^x$ when desired. At MLR there is a main-line relay, from which motion is received for actuating the apparatus at that station, which may be considered as a main telegraph-station at one of the larger cities. It closes a local circuit having the parts 8 8 8ʸ through a sounder and the parts 8 8 8ˣ through a clock J² and a relay NR⁴. The operator can receive preliminary signals through the sounder, and a final signal—such as one for synchronizing—through the circuit 8 8 8ˣ. When such signal occurs, the relay NR⁴ will close one or more clock-circuits, each of which can have the same parts as those above described in connection with the primary transmitting-station, such as a galvanometer, pole-changer, polarized relay, &c. In this case the testing of the clock or other time-signal-receiving devices will be accomplished from the distant station, which, as before stated, may be regarded as a secondary transmitting-station.

I do not claim herein any of the subjects matter set forth in the claims of my co-pending applications Serial No. 439,421, filed December 13, 1888, and renewed July 8, 1892, and Serial No. 404,760, filed September 4, 1891.

What I claim is—

1. The herein-described improvement in the method of operating and testing the electric circuits of a time-signaling system, it consisting in imparting electric impulses by a current of given polarity to a main line for operating time-signal-receiving devices and causing said impulses to close local circuits each through a polarized relay and imparting thereto a current of opposite polarity in testing such main line and reversing the direction in which the last said current traverses the magnets of the polarized relay, substantially as set forth.

2. In a time-signal-transmitting system, a transmitting-station, an electric circuit extending therefrom to one or more time-signal-receiving stations, and a time-signal-transmitting apparatus in said transmitting-station, said apparatus including a polarized relay, a main-line battery, and a pole-changer, substantially as set forth.

3. In a time-signal-transmitting system, a transmitting-station, an electric circuit extending therefrom to a time-signal-receiving station, a polarized relay at said receiving-station, and means for reversing the direction of the current through the said relay without affecting the direction of the current over the main line, substantially as set forth.

4. In a time-signaling system, an automatic signaling mechanism in a transmitting-station, an electric circuit extending therefrom to one or more time-signal-receiving stations, said circuit including (permanently, or possibly by means of switches) a polarized relay at the transmitting-station, a battery, and pole-changing switches, and a galvanometer, substantially as set forth.

5. In a time-signaling system, a time-signal-receiving station, a signal-receiving device in said station, a local circuit including said signal-receiving devices, and a relay or repeater at said receiving-station opening and closing said circuit, and a polar relay in the main-line circuit supplemental to the aforesaid relay or repeater and adapted to open and close the circuit through it, substantially as set forth.

6. In a time-signaling system, a main-line circuit, a polarized relay, a local circuit opened and closed by the said polarized relay, a secondary relay or repeater in said local circuit, a clock or time-signal-receiving device, and an electric circuit including the said clock or signal-receiving device and opened and closed by the said secondary relay or repeater, substantially as set forth.

7. The combination, with a series of clocks, as at J J′, and one or more electric circuits extending through said clocks, of the electro-magnetically-actuated contacts for closing the said circuits, a supplemental circuit, as at 8 8, for actuating the contacts, and the polar relay for opening and closing the supplemental circuit, substantially as set forth.

8. In a time-signal-receiving station, the combination of the polarized relay, the local circuit, as at 8 8, opened and closed by said polarized relay, and the clocks or time-signal-receiving devices actuated by said circuit, the switch $j$, or equivalent.

9. The combination of the clock J, the electric circuit through the clock, a relay or repeater, as at NR³, which opens and closes the said circuit, a main line, as at 3 3, and a polarized relay, as at PR², which opens and closes the circuit through the relay or repeater and which is adapted to have the current from the main line passed through it in either direction without change in said line 3 3, substantially as set forth.

10. The combination of the means for transmitting time-signals, the battery, the pole-changer, and the polarized relay, all in the observatory or transmitting-station, the electric circuit, as at 3 3, the clock-station, the local electric circuit in said clock-station, the clock in said circuit, and the polarized relay PR², adapted to have the current from the line 3 3 passed through it in either direction independently of the pole-changer at the observatory or transmitting-station, substantially as set forth.

11. The herein described method of testing electric circuits including relays or repeaters used for the transmission of time-signals, which consists in causing a current to flow along said circuit of a polarity opposite to that used in transmitting time-signals and, while said current is on said circuit breaking the connection of said circuit at one or more places, with time-signal-receiving devices, and then reversing the direction of the current through the relays or repeaters at said places to ascertain the movement of their armatures, substantially as set forth.

In testimony whereof I affix my signature in presence of two witnesses.

WILLIAM F. GARDNER.

Witnesses:
MARCUS L. BYNG,
J. C. STIER.